Patented Dec. 27, 1949

2,492,523

UNITED STATES PATENT OFFICE 2,492,523

ACID RESISTANT ENAMEL FRIT AND FERROUS METAL COATED WITH ENAMEL MADE FROM SAME

William W. Coffeen, Union, and Ralph R. Danielson, Elizabeth, N. J., assignors to Metal & Thermit Corporation, New York, N. Y., a corporation of New Jersey No Drawing. Application January 20, 1948, Serial No. 3,375

14 Claims. (Cl. 117—129)

This invention relates to acid-resistant vitreous enamel frits and more particularly to enamel frits containing an opacifying agent which has the effect of improving the acid resistance of the enamel while imparting thereto an opacity generally comparable to commercial enamels. In addition, the frits have improved smelting and working properties.

Antimony-containing opacifiers for use in enamel frits for ferrous metals include such compounds as antimony trioxide, calcium antimonate and sodium antimonate. The first two compounds, it has been found, lead to difficulties from the standpoint of color, and both are generally less satisfactory than sodium antimonate, which has been widely accepted. According to the present invention, it is proposed to employ barium antimonate as the opacifying agent, it having been found that superior acid resistant enamels may thereby be produced.

As is evident, the barium antimonate serves to introduce two components to the enamel frit, barium oxide BaO and antimony oxide $Sb_2O_5$. Compounds like $BaO.Sb_2O_5$, $5BaO.3Sb_2O_5$, $$3BaO.2Sb_2O_5$$

etc., are all useful in this connection. For convenience, these compounds are referred to as "barium antimonate," and it is intended to include by this expression, as used throughout the specification and claims, all combinations of BaO and $Sb_2O_5$, chemically combined with each other, in which the molecular ratio of BaO to $Sb_2O_5$ is 1:1 or higher. For the purposes of the invention it is essential, as will be demonstrated hereinafter, that all of the antimony oxide entering the frit be introduced in the form of barium antimonate. Preferably all of the barium oxide is so introduced, but part of it may be added in other forms.

In addition to barium oxide and antimony oxide, the frit in its preferred form contains the following ingredients: sodium oxide $Na_2O$, calcium oxide CaO, boron trioxide $B_2O_3$, silica $SiO_2$, titania $TiO_2$, fluorine $F_2$, and lead oxide PbO. The concentration limits, expressed as parts by weight, of the foregoing components may be tabulated as follows:

| | |
|---|---|
| $Na_2O$ | 12–20 |
| CaO | 0.5–4 |
| $B_2O_3$ | 3–12 |
| $SiO_2$ | 30–50 |
| $TiO_2$ | 2–10 |
| $F_2$ | 0.3–5 |
| PbO | 6–25 |
| BaO | 3–15 |
| $Sb_2O_5$ | 6–12 |

The sum total of the silica $SiO_2$ and titania $TiO_2$ should always be in the range of 35 to 55 parts by weight. The foregoing compositions are specially useful for application to ferrous metals such as cast iron.

In its broader aspect, and referring to the above table, the invention provides for the replacement of up to 10 parts of the sodium oxide by potassium oxide $K_2O$ and up to 5 parts by lithium oxide $Li_2O$. Aluminum oxide $Al_2O_3$ may be added in amounts up to 3 parts, zinc oxide ZnO up to 4 parts, and bismuth trioxide $Bi_2O_3$ in amounts up to 5 parts. Lead oxide may vary from 0 to 25 parts. Accordingly, the enamel of the invention may be more broadly defined as comprising:

| | |
|---|---|
| $Na_2O$ | 2–20 |
| $K_2O$ | 0–10 |
| $Li_2O$ | 0–5 | the sum total of the foregoing oxides always being in the range of 12 to 20 parts,

| | |
|---|---|
| CaO | 0.5–4 |
| $B_2O_3$ | 3–12 |
| $SiO_2$ | 30–50 |
| $TiO_2$ | 2–10 | the sum total of the last two oxides always being in the range of 35 to 55 parts

| | |
|---|---|
| $Al_2O_3$ | 0–3 |
| ZnO | 0–4 |
| $Bi_2O_3$ | 0–5 |
| $F_2$ | 0.3–5 |
| PbO | 0–25 |
| BaO | 3–15 |
| $Sb_2O_5$ | 6–12 | all of the $Sb_2O_5$ and at least part of the BaO being added to the enamel in the form of barium antimonate. The enamel, as thus broadly defined, is useful for ferrous metals in general, including sheet steel.

Each of the foregoing ingredients may be supplied from a variety of sources. For example, in preparing the batch for making the frit, sodium oxide may be introduced thereto as borax, sodium nitrate, sodium carbonate, sodium silicate, feldspar, etc.; calcium oxide as calcium fluoride, calcium carbonate, etc.; boron oxide as borax, either hydrated or not, boric acid, colemanite, razorite, etc.; silica as flint, feldspar, sodium silicate etc.; titanium dioxide as rutile, titanium hydrate, alkali metal titanates, etc.; aluminum oxide as feldspar, sodium aluminum fluoride, alumina, etc.; zinc oxide and bismuth trioxide as themselves and as their carbonates, etc.; lead oxide as white lead, red lead, lead silicate, litharge, etc.; fluorine as sodium fluoride, sodium silico fluoride, calcium fluoride, sodium aluminum fluoride, etc.; barium as barium antimonate, barium carbonate, barium nitrate, barium oxide, barium hydroxide, barium fluoride, etc.

The following examples may serve to illustrate the invention.

Three enamel frit compositions were prepared, identified below as A, B, and C. In composition A, sodium antimonate was employed as the principal opacifying ingredient, while in composition B barium antimonate was used, the amount being the same as the sodium antimonate. In composition C, the $Sb_2O_5$ was supplied in the form of sodium antimonate, while the BaO was introduced as barium carbonate. The first data given are the batch compositions preparatory to the smelting operation to form the enamel frits, then follows acid resistance and reflectance data, and finally the theoretical oxide content in parts by weight of the frits.

| Enamel Frit Batch Composition, Sample | A | B | C |
|---|---|---|---|
| Batch Ingredients: | | | |
| Flint_____grams__ | 393 | 393 | 393 |
| Titanium dioxide_____do____ | 60 | 60 | 60 |
| Borax_____do____ | 116 | 116 | 116 |
| Soda Nitre_____do____ | 70 | 70 | 70 |
| Soda Ash_____do____ | 170 | 170 | 142 |
| Fluorspar_____do____ | 35 | 35 | 35 |
| Sodium Silico Fluoride_____do____ | 15 | 15 | 15 |
| Litharge_____do____ | 190 | 190 | 190 |
| Sodium Antimonate_____do____ | 120 | | 97 |
| Barium Antimonate_____do____ | | 120 | |
| Barium carbonate_____do____ | | | 50 |
| Acid Resistance_____ | A | AA | D |
| Reflectance: | | | |
| Blue_____ | 79.2 | 76.4 | 77.0 |
| Green_____ | 82.5 | 79.2 | 77.3 |
| Amber_____ | 83.1 | 79.6 | 77.4 |
| Oxide Content: | | | |
| $Na_2O$_____grams__ | 16.7 | 14.7 | 14.7 |
| CaO_____do____ | 2.5 | 2.5 | 2.5 |
| $B_2O_3$_____do____ | 4.2 | 4.2 | 4.2 |
| $SiO_2$_____do____ | 39.6 | 39.6 | 39.6 |
| $TiO_2$_____do____ | 5.9 | 5.9 | 5.9 |
| $F_2$_____do____ | 2.6 | 2.6 | 2.6 |
| PbO_____do____ | 18.8 | 18.8 | 18.8 |
| BaO_____do____ | | 3.9 | 3.9 |
| $Sb_2O_5$_____do____ | 9.9 | 8.0 | 8.0 |

In each case a frit was prepared by smelting the batch composition, and the resulting glass was poured into water, quenched, dried and ground to powder. Iron castings to be enameled were cleaned by blasting and sprayed with a conventional slush or ground coat to promote adherence and to prevent excessive oxidation of the iron during the later heat treatment. The ground-coated castings were then heated to 1600° F. and the above-described frit powders applied by dredging or dusting the same thereon by means of a vibrating sieve. The amount of frit powder applied was 360 grams per square foot of metal surface. Thereafter the castings were fired again to finally fuse the coating in place.

It will be seen that composition B has a better acid resistance than composition A, while having a generally comparable reflectance or opacity. It might be assumed that such improvement in acid resistance was merely a result of the flux exchange of barium oxide BaO for sodium oxide $Na_2O$ which accompanies a pound for pound substitution of barium antimonate for sodium antimonate. To check this assumption, composition C was prepared in which the oxide content of composition B was duplicated, but using sodium antimonate as the source of antimony oxide $Sb_2O_5$ and barium carbonate as the source of barium oxide. As is evident, composition C has poor acid resistance. It is thus indicated that for optimum acid resistance, the BaO and $Sb_2O_5$ must be introduced to the enamel frit in the form of barium antimonate.

Composition B also showed greater fluidity during smelting than composition A, thus permitting a reduced smelting time.

The acid resistance tests were carried out according to the procedure described in "Test for Acid Resistance of Porcelain Enamels," Part I, Flatware, pages 4–6, April 1940, Porcelain Enamel Institute, Inc. The reflectance data were obtained with a standard Hunter multi-purpose reflectometer according to the standard Reflectance Test of the Product Standards Section, Porcelain Enamel Institute, Inc., revised August 1944. While the enamel frits in the above example were applied by the dry process, they may also be applied in appropriate cases, by the wet process by wet milling the frits with the usual mill additions to form enamel slips and applying the slips by spraying or dipping. Conventional temperatures and times of application for the wet or dry process may be employed.

Examples of other enamel frits made according to the invention are as follows, the concentrations being in terms of parts by weight:

| Enamel Frit Batch Composition, Sample | D | E |
|---|---|---|
| Batch Ingredients: | | |
| Flint_____grams__ | 653 | 593 |
| Titanium Dioxide_____do____ | 90 | 90 |
| Borax_____do____ | 173 | 173 |
| Soda Nitre_____do____ | 105 | 105 |
| Soda Ash_____do____ | 254 | 254 |
| Fluorspar_____do____ | 53 | 53 |
| Sodium Silico Fluoride_____do____ | 23 | 23 |
| Litharge_____do____ | 225 | 165 |
| Barium Antimonate_____do____ | 179 | 179 |
| Barium Carbonate_____do____ | | 154 |
| Acid Resistance_____ | AA | AA |
| Reflectances: | | |
| Blue_____ | 78.8 | 77.3 |
| Green_____ | 79.2 | 74.5 |
| Amber_____ | 79.2 | 73.6 |
| Oxide Content: | | |
| $Na_2O$_____grams__ | 14.7 | 14.7 |
| CaO_____do____ | 2.5 | 2.5 |
| $B_2O_3$_____do____ | 4.2 | 4.2 |
| $SiO_2$_____do____ | 43.5 | 39.6 |
| $TiO_2$_____do____ | 5.9 | 5.9 |
| $F_2$_____do____ | 2.6 | 2.6 |
| PbO_____do____ | 14.8 | 10.9 |
| BaO_____do____ | 3.8 | 11.7 |
| $Sb_2O_5$_____do____ | 8.0 | 8.0 |

The invention is applicable for producing white enamels and also pastel shades.

In the light of the foregoing description, the following is claimed:

1. An acid resistant enamel frit for application to ferrous metal consisting of about 14.7 parts of $Na_2O$, about 2.5 parts of CaO, about 4.2 parts of $B_2O_3$, about 39.6 parts of $SiO_2$, about 5.9 parts of $TiO_2$, about 2.6 parts of $F_2$, about 18.8 parts of PbO, about 3.9 parts of BaO, and about 8.0 parts of $Sb_2O_5$, all of the $Sb_2O_5$ and BaO being added in the form of barium antimonate, and all parts being by weight.

2. An acid resistant enamel frit for application to ferrous metal consisting of the following components and concentrations, the concentrations being in terms of parts by weight:

| | |
|---|---|
| $Na_2O$ | 12–20 |
| CaO | 0.5–4 |
| $B_2O_3$ | 3–12 |
| $SiO_2$ | 30–50 |
| $TiO_2$ | 2–10 | the sum total of the last two oxides always being in the range of 35 to 55,

| | |
|---|---|
| $F_2$ | 0.3–5 |
| PbO | 6–25 |
| BaO | 3–15 |
| $Sb_2O_5$ | 6–12 | all of the $Sb_2O_5$ and at least part of the BaO being added in the form of barium antimonate.

3. An acid resistant enamel frit for application to ferrous metal consisting of the following components and concentrations, the concentrations being in terms of parts by weight:

| | |
|---|---|
| $Na_2O$ | 2–20 |
| $K_2O$ | up to 10 |
| $Li_2O$ | up to 5 | the sum total of the foregoing oxides always being in the range of 12 to 20 parts,

| | |
|---|---|
| CaO | 0.5–4 |
| $B_2O_3$ | 3–12 |
| $SiO_2$ | 30–50 |
| $TiO_2$ | 2–10 | the sum total of the last two oxides always being in the range of 35 to 55,

| | |
|---|---|
| $F_2$ | 0.3–5 |
| PbO | 6–25 |
| BaO | 3–15 |
| $Sb_2O_5$ | 6–12 | all of the $Sb_2O_5$ and at least part of the BaO being added in the form of barium antimonate.

4. An acid resistant enamel frit for application to ferrous metal consisting of the following components and concentrations, the concentrations being in terms of parts by weight:

| | |
|---|---|
| $Na_2O$ | 2–20 |
| $K_2O$ | up to 10 |
| $Li_2O$ | up to 5 | the sum total of the foregoing oxides always being in the range of 12 to 20 parts,

| | |
|---|---|
| CaO | 0.5–4 |
| $B_2O_3$ | 3–12 |
| $SiO_2$ | 30–50 |
| $TiO_2$ | 2–10 | the sum total of the last two oxides always being in the range of 35 to 55,

| | |
|---|---|
| $Al_2O_3$ | up to 3 |
| ZnO | up to 4 |
| $Bi_2O_3$ | up to 5 |
| $F_2$ | 0.3–5 |
| PbO | 6–25 |
| BaO | 3–15 |
| $Sb_2O_5$ | 6–12 | all of the $Sb_2O_5$ and at least part of the BaO being added in the form of barium antimonate.

5. An acid resistant enamel frit for application to ferrous metal consisting of the following components and concentrations, the concentrations being in terms of parts by weight:

| | |
|---|---|
| $Na_2O$ | 12–20 |
| CaO | 0.5–4 |
| $B_2O_3$ | 3–12 |
| $SiO_2$ | 30–50 |
| $TiO_2$ | 2–10 | the sum total of the last two oxides always being in the range of 35 to 55,

| | |
|---|---|
| $F_2$ | 0.3–5 |
| PbO | up to 25 |
| BaO | 3–15 |
| $Sb_2O_5$ | 6–12 | all of the $Sb_2O_5$ and at least part of the BaO being added in the form of barium antimonate.

6. An acid resistant enamel frit for application to ferrous metal consisting of the following components and concentrations, the concentrations being in terms of parts by weight:

| | |
|---|---|
| $Na_2O$ | 2–20 |
| $K_2O$ | up to 10 |
| $Li_2O$ | up to 5 | the sum total of the foregoing oxides always being in the range of 12 to 20 parts,

| | |
|---|---|
| CaO | 0.5–4 |
| $B_2O_3$ | 3–12 |
| $SiO_2$ | 30–50 |
| $TiO_2$ | 2–10 | the sum total of the last two oxides always being in the range of 35 to 55,

| | |
|---|---|
| $F_2$ | 0.3–5 |
| PbO | up to 25 |
| BaO | 3–15 |
| $Sb_2O_5$ | 6–12 | all of the $Sb_2O_5$ and at least part of the BaO being added in the form of barium antimonate.

7. An acid resistant enamel frit for application to ferrous metal consisting of the following components and concentrations, the concentrations being in terms of parts by weight:

| | |
|---|---|
| $Na_2O$ | 2–20 |
| $K_2O$ | up to 10 |
| $Li_2O$ | up to 5 | the sum total of the foregoing oxides always being in the range of 12 to 20 parts,

| | |
|---|---|
| CaO | 0.5–4 |
| $B_2O_3$ | 3–12 |
| $SiO_2$ | 30–50 |
| $TiO_2$ | 2–10 | the sum total of the last two oxides always being in the range of 35 to 55,

| | |
|---|---|
| $Al_2O_3$ | up to 3 |
| ZnO | up to 4 |
| $Bi_2O_3$ | up to 5 |
| $F_2$ | 0.3–5 |
| PbO | up to 25 |
| BaO | 3–15 |
| $Sb_2O_5$ | 6–12 | all of the $Sb_2O_5$ and at least part of the BaO being added in the form of barium antimonate.

8. Ferrous metal coated with an enamel made from the frit described in claim 1.

9. Ferrous metal coated with an enamel made from the frit described in claim 2.

10. Ferrous metal coated with an enamel made from the frit described in claim 3.

11. Ferrous metal coated with an enamel made from the frit described in claim 4.

12. Ferrous metal coated with an enamel made from the frit described in claim 5.

13. Ferrous metal coated with an enamel made from the frit described in claim 6.

14. Ferrous metal coated with an enamel made from the frit described in claim 7.

WILLIAM W. COFFEEN.
RALPH R. DANIELSON.

REFERENCES CITED

The following references are of record in the file of this patent:

UNITED STATES PATENTS

| Number | Name | Date |
|---|---|---|
| 2,414,633 | Bryant | Jan. 21, 1947 |

FOREIGN PATENTS

| Number | Country | Date |
|---|---|---|
| 628,487 | Germany | 1936 |